Figure 1:
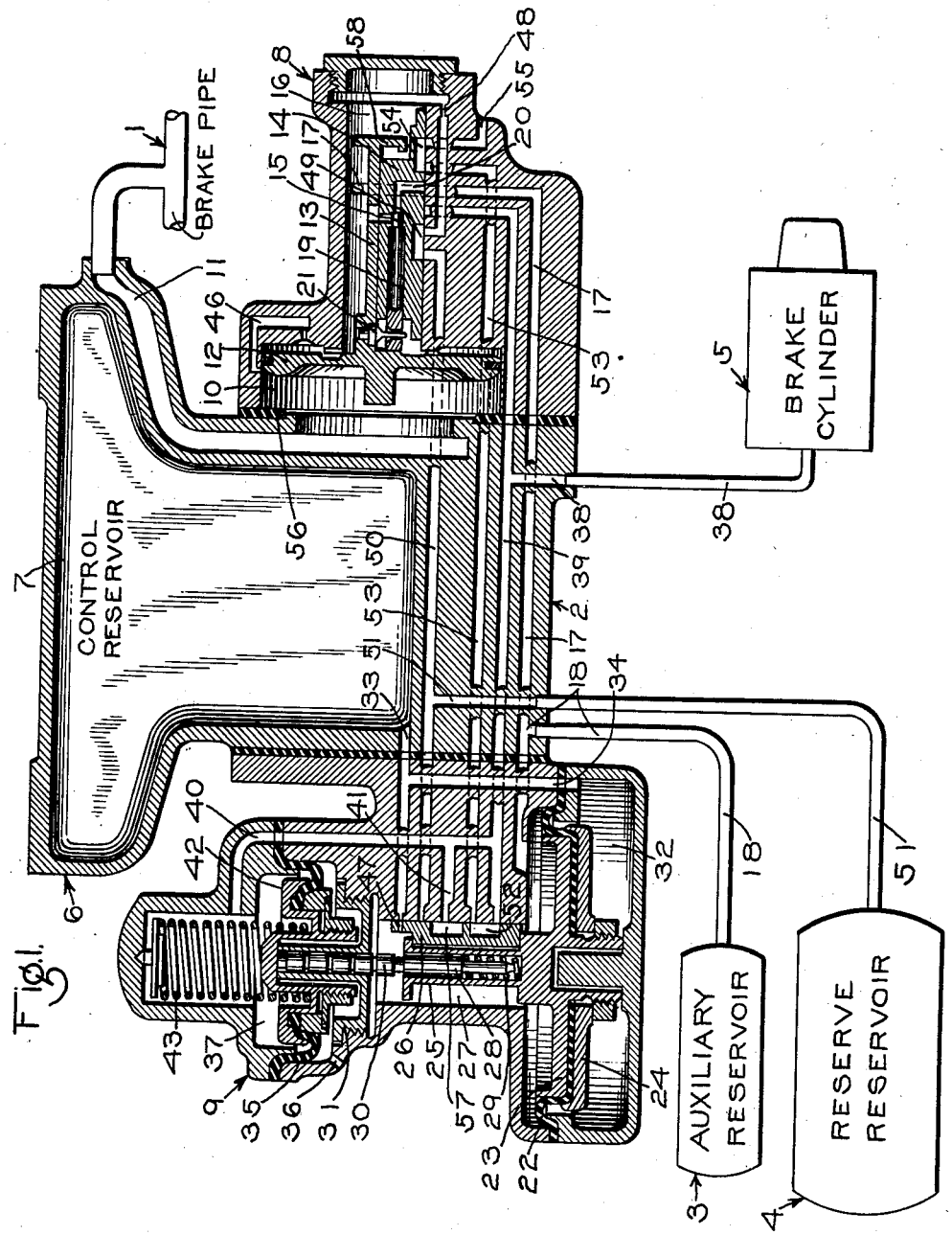

May 21, 1940.  E. S. COOK ET AL  2,201,574
FLUID PRESSURE BRAKE EQUIPMENT
Filed June 10, 1938  4 Sheets-Sheet 1

INVENTORS
EARLE S. COOK
JOHN CANETTA
BY
ATTORNEY

May 21, 1940.  E. S. COOK ET AL  2,201,574

FLUID PRESSURE BRAKE EQUIPMENT

Filed June 10, 1939   4 Sheets-Sheet 2

INVENTORS
EARLE S. COOK
JOHN CANETTA
BY
ATTORNEY

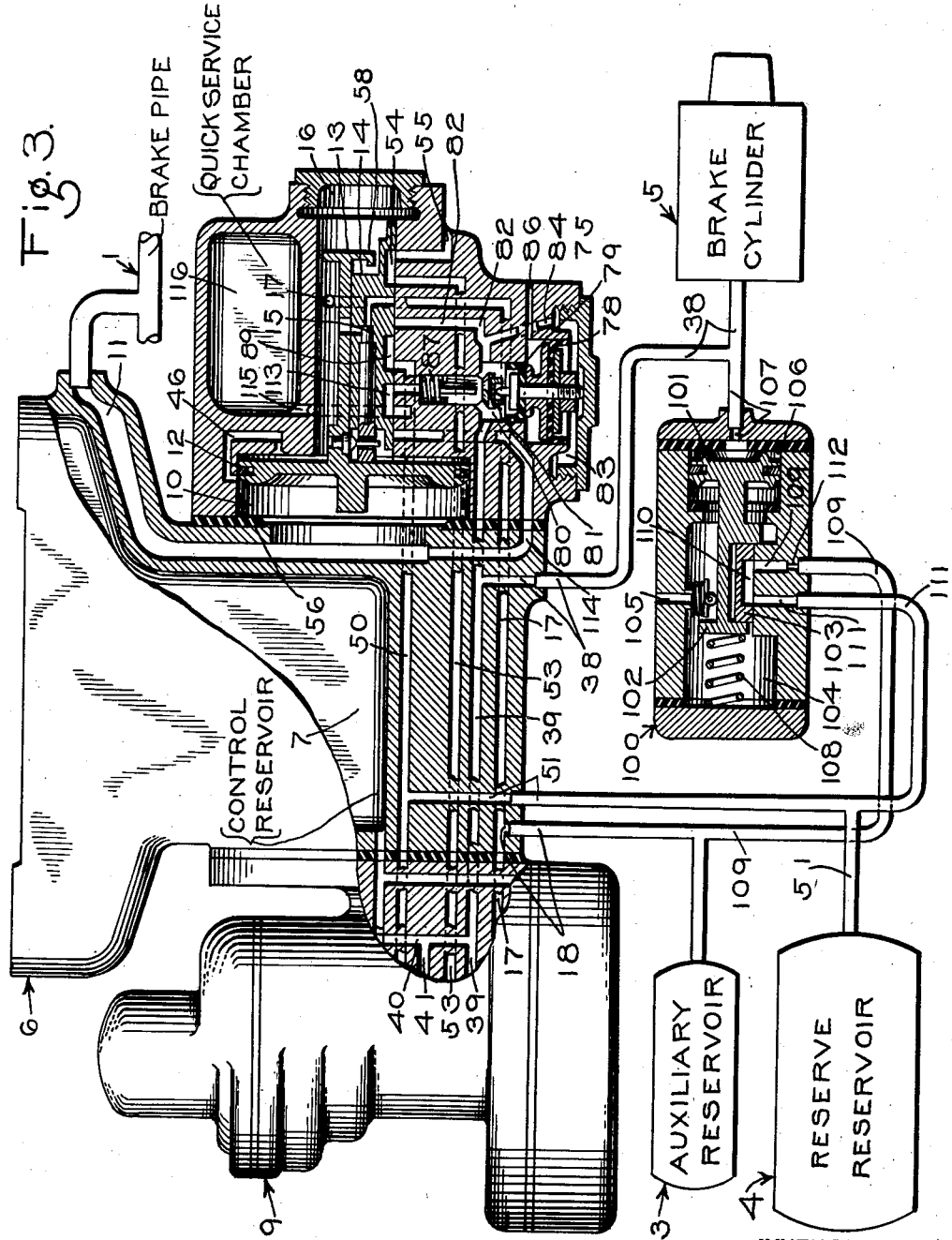

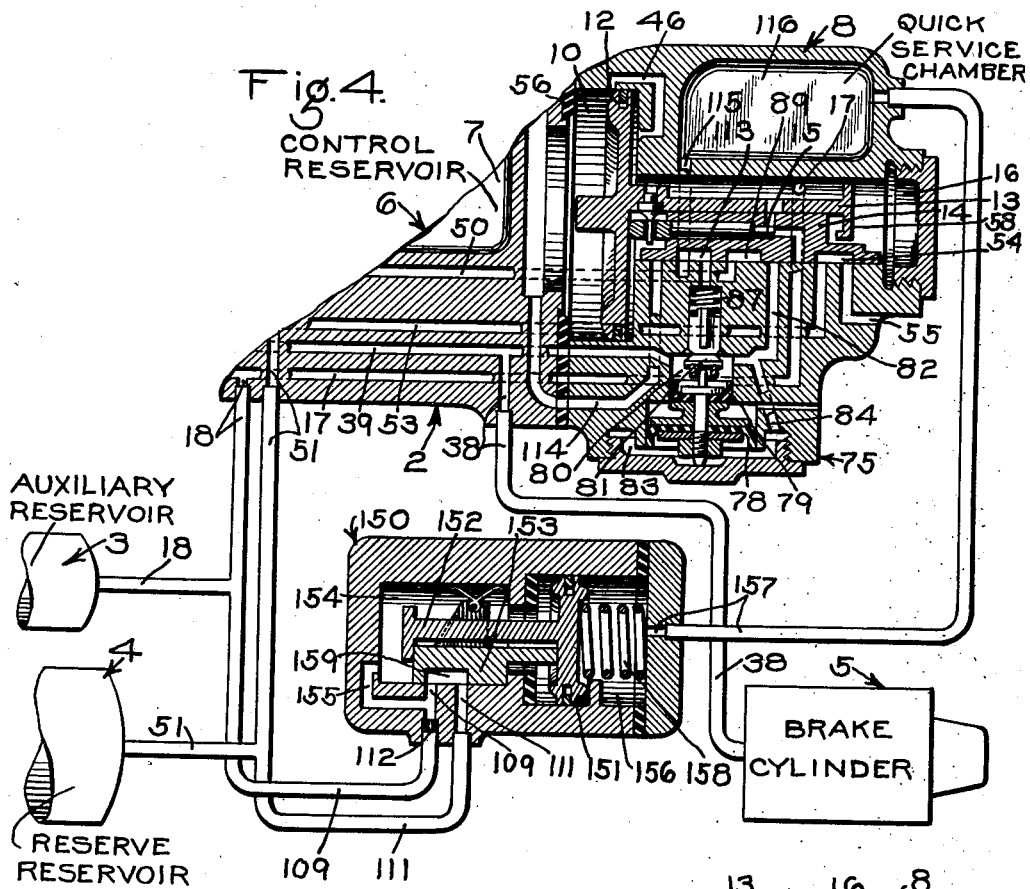
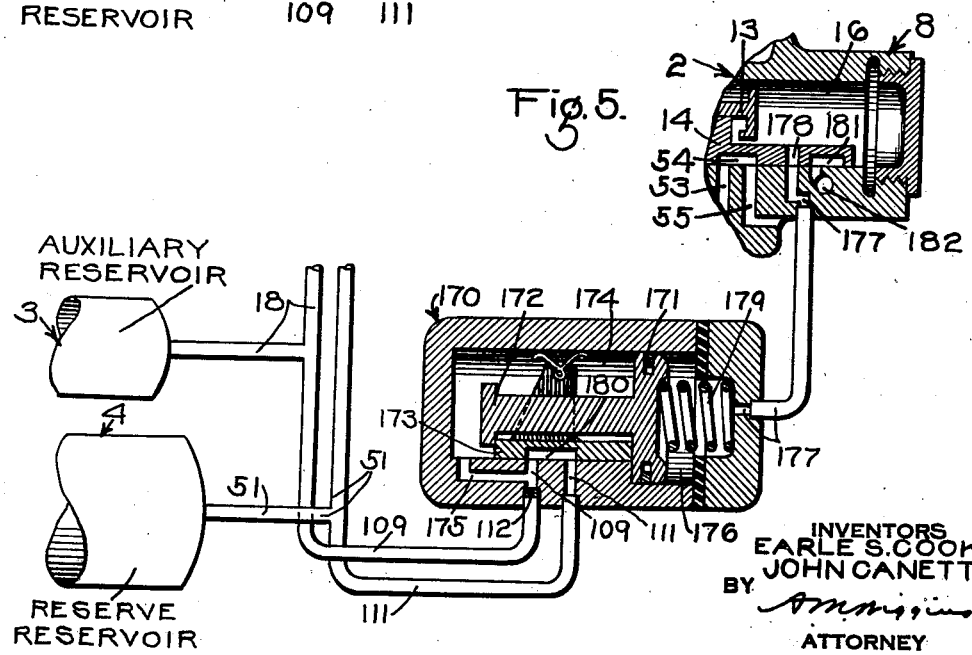

Patented May 21, 1940

2,201,574

UNITED STATES PATENT OFFICE 2,201,574

FLUID PRESSURE BRAKE EQUIPMENT

Earle S. Cook and John Canetta, Wilkinsburg, Pa., assignors to The Westinghouse Air Brake Company, Wilmerding, Pa., a corporation of Pennsylvania Application June 10, 1938, Serial No. 212,873
In Chile and Argentina April 18, 1938

14 Claims. (Cl. 303—60)

This invention relates to fluid pressure brakes and more particularly to a brake equipment of the type having means for maintaining brake cylinder pressure against leakage during an application of the brakes.

It has heretofore been proposed to provide a fluid pressure brake equipment having a triple valve device, an auxiliary reservoir, a supplementary reservoir, and an application control valve device, the control valve device being automatically operative in effecting an application of the brakes to admit fluid under pressure from the supplemental reservoir to the brake cylinder when, due to leakage, the brake cylinder pressure reduces. In such a brake equipment there is at all times a communication between the supplemental reservoir and the auxiliary reservoir so that when in maintaining brake cylinder pressure against leakage the pressure of the supplemental reservoir is reduced below auxiliary reservoir pressure fluid under pressure will flow from the auxiliary reservoir to the supplemental reservoir and consequently to the brake cylinder. When due to this flow of fluid the auxiliary reservoir pressure falls below brake pipe pressure the triple valve piston will move to release position in which the usual feed groove which extends from one side of the piston to the other will be opened and therefore permit fluid under pressure to flow from the brake pipe to the brake cylinder.

When the triple valve piston and associated graduating and main valves thus move to release position the application control valve device remains in application position so that the release of the brakes is not effected. To effect the release of the brakes it is necessary to increase brake pipe pressure. Since in maintaining brake cylinder pressure the brake pipe and auxiliary reservoir have been reduced considerably below that normally required to effect an application of the brakes the recharging of the brake pipe to effect release of the brakes will be objectionably delayed. In some cases where the brake cylinder leakage on a long train is excessive the normal rate of increase in brake pipe pressure may be insufficient to effect the release of the brakes. From the foregoing it will be understood that on long trains, say for instance seventy-five or more cars, the effect of brake cylinder leakage on the rate of increase in brake pipe pressure will be such as to so delay the release of the brakes that the equipment will be devoid of its required flexibility of control.

On trains where the cars are equipped with graduated release brake controlling valve devices the above mentioned method of maintaining brake cylinder pressure against leakage has been found to be especially objectionable. This will be readily seen when it is remembered that to effect the complete release of the brakes the brake pipe pressure must be restored to substantially its initial or normal value and that the attainment of such brake pipe pressure is unduly delayed due to the robbing of brake pipe and auxiliary reservoir of fluid to maintain the brake cylinder pressure against leakage.

The principal object of the present invention is to provide an improved fluid pressure brake equipment of the above type which will be free of the above mentioned objectionable features.

Another object of the invention is to provide an improved fluid pressure brake equipment of the above mentioned type having means whereby when an application of the brakes has been effected the brake cylinder pressure may be maintained against leakage without increasing the period of time normally required to effect a release of the brakes.

Another object of the invention is to provide an improved fluid pressure brake equipment of the above mentioned type having means whereby when an application of the brakes has been effected the brake cylinder pressure may be maintained against leakage without effecting a reduction in auxiliary reservoir pressure or brake pipe pressure or both.

Other objects and advantages will be apparent from the following more detailed description of the invention.

Figure 2:
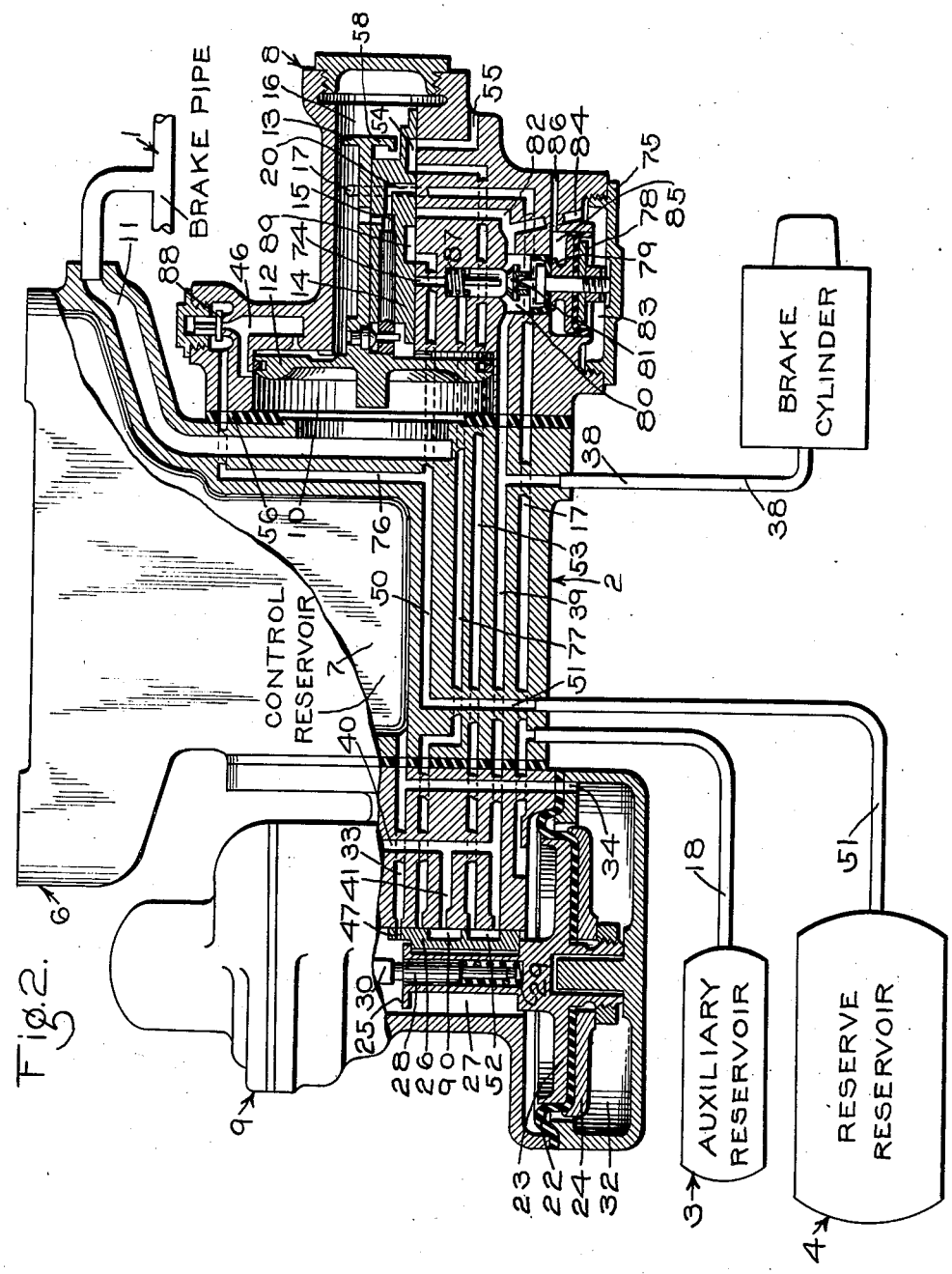

In the accompanying drawings, Fig. 1 is a diagrammatic view, mainly in section, of a fluid pressure brake equipment embodying one form of the invention; Fig. 2 is a similar diagrammatic view of a fluid pressure brake equipment embodying another form of the invention and Fig. 3 is a diagrammatic view, partly in section, of a fluid pressure brake equipment embodying still another form of the invention; and Figs. 4 and 5 are fragmentary diagrammatic sectional views, each illustrating still another form of the invention.

As shown in Fig. 1 of the drawings the improved fluid pressure brake equipment may comprise a brake pipe 1, a brake controlling valve mechanism 2, an auxiliary reservoir 3, a reserve reservoir 4 and a brake cylinder 5.

The brake controlling valve mechanism 2 may comprise a pipe bracket 6 having formed therein a control reservoir 7. Secured to one side of this pipe bracket by any suitable means is a triple valve device 8 and secured to the opposite side is an application control valve device 9.

The triple valve device may comprise a casing having formed therein a chamber 10 which is connected through a passage 11 to the brake pipe 1 and which contains a piston 12 having a stem 13 for actuating a main slide valve 14 and a graduating valve 15 contained in a valve chamber 16 which is connected to the auxiliary reservoir through a passage 17 and a branch passage and pipe 18.

The graduating valve 15 is carried by the inner end of a short circular rod which is slidably mounted in a correspondingly shaped recess or bore 19 in the main slide valve for a limited movement relative to the main slide valve, the valve being adapted to either open or close communication between the slide valve chamber 16 and a service port 20 provided in the main slide valve.

Beyond the forward end of the main slide valve 14 the outer end of the rod carrying the graduating valve is operatively connected with the piston stem 13 by means of a pin 21 or the like which is rigidly secured to the stem in any desired manner.

The application control valve device 9 may comprise a casing having mounted therein a flexible diaphragm 22 to the opposite side of which is clamped inner and outer followers 23 and 24, respectively. The inner follower 23 is provided with a stem 25 for actuating a slide valve 26 contained in a chamber 27 which is connected to the passage 17 and consequently to the auxiliary reservoir and slide valve chamber 16 of the triple valve device.

The follower stem 25 for the greater portion of its length is hollow and has slidably mounted therein a plunger 28. The inner end of this plunger is normally maintained out of engagement with the follower 23 by means of a spring 29, and the inner end is engaged by one end of a plunger extension 30 which extends through a central opening in a member 31 secured to the casing and forming a wall of the chamber 27, said plunger extension being provided with labyrinth packing means to prevent the escape of fluid under pressure from the chamber 27 to the opposite side of the wall member 31.

At the outer side of the flexible diaphragm 22 and containing the outer follower 24 is a chamber 32 which is connected to the control reservoir 7 through a passage 33 and a branch passage 34, the passage 33 leading to the seat for the control slide valve 26.

The application control valve device may also comprise a flexible diaphragm 35 which is mounted in the casing and is located beyond the wall member 31, the chamber defined by the casing member 31 and one side of the diaphragm being connected to the atmosphere through a passage 36. At the other side of the diaphragm 35 is a chamber 37 to which the brake cylinder 5 is connected through a pipe and passage 38 and passages 39 and 40. The passage 39 leads at one end to the seat for the triple valve main slide valve and at the other end leads to the seat for the control slide valve 26. Leading from the passage 40 to the seat for the control slide valve 26 is a branch passage 41.

Contained in the chamber 37 and interposed between and engaging a spring seat associated with the casing and a follower 42 which is clamped to the diaphragm 35 is a spring 43. The follower 42 operatively engages the adjacent end of the plunger extension 30.

The reserve reservoir 4 is connected through a passage and pipe 51 to a passage 50 which leads at one end to the seat for the triple valve main slide valve and at the other end to the seat for the control slide valve 26.

*Initial charging of equipment*

In initially charging the equipment fluid under pressure is supplied to the brake pipe 1 and triple valve piston chamber 10 in the usual manner assuming the several parts of the triple valve device and application control valve device to be in release position as shown in Fig. 1, fluid under pressure flows from the triple valve piston chamber 10 through a feed passage 46 to the triple valve slide valve chamber 16, and from thence flows through passage 17 and passage and pipe 18 to the auxiliary reservoir 3. Fluid under pressure also flows from the passage 17 to the slide valve chamber 27 of the application control valve device.

From the chamber 27 fluid under pressure flows through a small port 47 in the control slide valve 26 and passage 33 to the control reservoir 7 and from the passage 33 flows through branch passage 34 to the diaphragm chamber 32 of the application control valve device.

Fluid under pressure supplied to the valve chamber 16 of the triple valve device, besides flowing to the auxiliary reservoir 3 as hereinbefore described, also flows to the reserve reservoir 4 by way of a restricted passage 48, a cavity 49 in the triple valve main slide valve, passage 50 and branch passage and pipe 51, the passage 50 leading to the seat for the control slide valve 26.

With the equipment fully charged with fluid under pressure and the several parts of the brake controlling valve mechanism in release position the brake cylinder 5 is connected to the atmosphere through pipe and passage 38, passage 39, a cavity 52 in the control slide valve 26, a passage 53, a cavity 54 in the triple valve main slide valve and a passage 55, so that the brakes will be released. The chamber 37 of the application control valve, since it is in open communication with the passage 39 by way of passage 40, will be at atmospheric pressure.

Since with the equipment fully charged the pressures of fluid acting on opposite sides of the flexible diaphragm 22 are substantially equal to each other, the several parts of the application control valve device will remain in release position.

*Application of the brakes*

To effect an application of the brakes a reduction in brake pipe pressure is effected in the usual manner. This reduction is effective in the piston chamber 10, so that fluid at the higher auxiliary reservoir pressure in valve chamber 16 causes the piston 12 of the triple valve device and thereby the associated main and graduating valve to move to application position, the piston in its application position sealing against a gasket 56 which is clamped between adjacent faces of the triple valve casing and pipe bracket. The piston in its traverse toward application position first closes the feed passage 46 and moves the graduating valve 15 relative to the main slide valve 14 to establish communication from the valve chamber 16 to the service port 20 in the main slide valve. Following the closing of the feed passage, a lug 58 on the inner end of the triple valve piston stem 13 engages the rear end of the main slide valve and, as the piston continues to move, shifts both valves in unison toward application position. The main slide valve as it is initially moved cuts off communication from the passage 53 to the passage 55 leading to the atmosphere, and at substantially the same time cuts off communication between the passages 48 and 50 thereby isolating the auxiliary reservoir from the reserve reservoir 4. Now when the main slide valve moves into application position, the service port 20, which has been previously opened by the graduating valve 15, registers with the passage 39, so that fluid under pressure flows from the triple valve slide valve chamber 16 and consequently from the auxiliary reservoir to both the brake cylinder 5 and chamber 37 of the application control valve device. Fluid under pressure thus supplied causes the brake cylinder to operate to initiate an application of the brakes.

Since the valve chamber 27 of the application control valve device is in open communication with the auxiliary reservoir 3, the pressure of fluid in this chamber reduces with auxiliary reservoir pressure. Upon the reduction in the chamber pressure the pressure of fluid in the control chamber 32 causes the diaphragm 22 to flex inwardly thereby causing the followers 23 and 24 and slide valve 26 to move in the same direction. As the slide valve 26 is thus being moved it first laps the passage 33, thereby cutting off communication between the valve chamber 27 and the control reservoir 7. After the passage 33 is lapped the continued inward movement of the diaphragm causes the follower 23 to engage the end of the plunger 28 and through the medium of this plunger, the plunger extension 30 and follower 42, flexes the diaphragm 35 outwardly against the opposing pressures of the spring 43 and the rising brake cylinder pressure in chamber 37. The follower as it continues to move shifts the control slide valve to application position in which a cavity 57 in the valve connects the brake cylinder branch passage 41 to the passage 50, so that fluid under pressure now flows from the reserve reservoir 4 to the brake cylinder 5 by way of pipe and passage 51, passage 50, cavity 57, branch passage 41, passage 40, passage 39 and passage and pipe 38. Fluid under pressure supplied to the passage 40 also flows to the diaphragm chamber 37.

The slide valve 26 in application position laps the brake cylinder passage 39.

Now when the brake pipe reduction is stopped by turning the usual brake valve device (not shown) to lap position and the pressure of fluid in the triple valve slide valve chamber 16 and connected auxiliary reservoir reduces, by the flow of fluid therefrom to the brake cylinder, slightly below brake pipe pressure in the triple valve piston chamber 10, said piston moves inwardly and shifts the graduating valve 15 relative to the main slide valve 14 to application lap position to cut off the flow of fluid from the chamber 16 to the service port.

With the triple valve device in service lap position, as just described, the reduction in the pressure of fluid in the chamber 27 of the application control valve device will be stopped since this chamber is in open communication with the auxiliary reservoir. Now when the brake cylinder pressure present in chamber 37 is increased by the continued flow of fluid from the reserve reservoir to overcome the pressure of fluid in the control chamber 32 and acting on the diaphragm 22, the diaphragm 35 acts to shift the follower and thereby the slide valve 26 toward release position until the valve cuts off communication between the passages 50 and 41. This cuts off the flow of fluid from the reserve reservoir to the brake cylinder and chamber 37 and since the pressure in the chamber can not now increase the several parts of the control valve device will come to a stop so that the brakes will be held applied.

*Maintaining brake cylinder pressure against leakage*

Should the pressure of fluid in the brake cylinder reduce due to leakage while the triple valve device and application control valve device are in lap position, the pressure of fluid in the chamber 37 of the application control valve device will reduce with brake cylinder pressure and the pressure of fluid in the control chamber 32 will as a consequence cause the diaphragm 22 to flex inwardly thereby moving the slide valve 26 from lap position to application position in which fluid under pressure again flows from the reserve reservoir 4 to the brake cylinder in the same manner as above described in connection with the application of the brakes until such time as the brake cylinder pressure present in chamber 37 becomes sufficient to cause the return of the several parts of the application control valve device to application lap position. It will thus be seen that brake cylinder pressure is maintained against leakage by fluid under pressure supplied from only the reserve reservoir 4, the auxiliary reservoir being isolated from the reserve reservoir with the triple valve device in application lap position and the application control valve device in either application position or application lap position.

Since, in maintaining the brake cylinder pressure against leakage, the auxiliary reservoir pressure cannot be reduced, the triple valve device will remain in application lap position, so that the feed passage 46 will remain closed to the brake pipe, therefore there can be no flow of fluid under pressure from the brake pipe to the brake cylinder when leakage from the brake cylinder occurs.

From the above description it will be apparent that the maintenance of brake cylinder pressure against leakage will in no way reduce auxiliary reservoir or brake pipe pressure and therefore cannot increase the time required to effect a release of the brakes.

*Full release of the brakes*

Assuming the several parts of the triple valve device and application control valve device to be in application lap position and it is desired to effect the release of the brakes, the pressure of fluid in the brake pipe is increased in the usual manner. This increase in brake pipe pressure causes the piston 12 and thereby the main valve 14 and graduating valve to move inwardly to release position in which the piston uncovers the feed passage 46 to the triple valve piston chamber 10, the cavity 49 in the main slide valve 14 connects the passages 50 and 48 together and the cavity 54 also in the main slide valve connects the passage 53 to the exhaust passage 55.

With the feed passage 46 thus connected to the piston chamber 10 fluid under pressure flows through this passage to the triple valve slide valve chamber 16 and from thence flows to the auxiliary reservoir 3 and chamber 27 of the application control valve device by way of passage 17.

The increase in the pressure of fluid in chamber 27 due to the flow of fluid under pressure from the brake pipe causes the flexible diaphragm to flex to its normal position as shown in Fig. 1, the diaphragm actuating the stem 25 and thereby the slide valve 26 to release position.

With the slide valve 26 in release position the cavity 52 therein connects the brake cylinder passage 39 to the exhaust passage 53 so that fluid under pressure is now vented from the brake cylinder and chamber 37 of the application control valve device by way of passage 39, cavity 52, passage 53, cavity 54 in the main slide valve of the triple valve device and exhaust passage 55.

With the passages 48 and 50 connected together by means of the cavity 49 in the main slide valve of the triple valve device the reserve reservoir is recharged with fluid under pressure from the triple valve slide valve chamber 16.

With the slide valve 26 of the application control valve device in release position the port 47 in the valve is open to the passage 33 so that if the control reservoir pressure has for any reason reduced during an application of the brakes it may be restored by the flow of fluid through this port and passage.

Graduated release of the brakes

When it is desired to graduate the release of the brakes, that is to say, release the brakes in steps or increments the brake pipe pressure is increased in any desired number of steps, the amount of increase in brake pipe pressure for each step being dependent upon the manipulation of the usual brake valve device by the engineman. When a step increase in brake pipe pressure is effected, the triple valve device and application control valve device will operate in the same manner as hereinbefore described in connection with the full release of the brakes to release fluid under pressure from the brake cylinder and consequently from the chamber 37 of the application control valve device. Upon the reduction in the pressure of fluid in chamber 37 the pressure of fluid in diaphragm chamber 32 causes the diaphragm 22 to flex inwardly thereby moving the slide valve 26 in the same direction to lap the passage 39. With the passage 39 thus lapped the further flow of fluid from the brake cylinder to the atmosphere is cut off and as a consequence the several parts of the application control valve device come to an immediate stop in release lap position. Upon a further step increase in brake pipe pressure the several parts of the application control valve device will be caused to move outwardly again to release position and when the reduction in brake cylinder pressure as called for by the amount of increase in brake pipe pressure has been effected the parts of the device are caused to again move to release lap position. From this it will be seen that the brakes may be released in a plurality of steps.

It will here be noted that if, during an application of the brakes, the brake cylinder pressure has been maintained against leakage, the rate of the subsequent release of the brakes whether it be a straight away release or a graduated release will not be slowed up since the maintenance of brake cylinder pressure can in no way reduce brake pipe pressure or auxiliary reservoir pressure. From this it is obvious that the present invention insures the obtaining of the necessary quick release of the brakes.

Description of equipment shown in Fig. 2

In Fig. 2 another form of the invention is shown in which the several parts of the brake equipment with but several exceptions may be identical with those of the equipment shown in Fig. 1. In view of this the following description will be more or less limited to the parts, arrangements of ports and passages and operating characteristics which are not included in the equipment shown in Fig. 1.

As shown in Fig. 2 the equipment differs from the equipment illustrated in Fig. 1 in that it includes an inshot valve device 75, a passage 76 connecting the reserve reservoir 4 to the feed passage 46 of the triple valve device. Another difference resides in the elimination of the control of the passage 50 by the operation of the application control valve device and the addition of means to the triple valve device for such control, the elimination of the cavity 49 from the triple valve main slide valve and the elimination of the charging passage 48 leading from the triple valve slide valve chamber 16. A further difference resides in the provision of a passage 77 which leads from the seat for the slide valve 26 of the application control valve device to the inshot valve device for the purpose of controlling the flow of fluid from the reserve reservoir 4 as will hereinafter more fully appear. Other differences will be obvious from the following detailed description of the inshot valve device, and the operation of the equipment.

The inshot valve device 75 may comprise a piston assemblage consisting of spaced but connected pistons 78 and 79, the piston 78 being of greater diameter than piston 79. The face of the piston 79 is exposed to a valve chamber 80 which contains an inshot control valve 81 adapted to be actuated by the piston assemblage to control communication between the valve chamber and a passage 74 leading from the seat for the triple valve main slide valve. The chamber 80 is connected to a passage 82 leading from the seat for the triple valve main slide valve and is also connected to the brake cylinder passage 39. The face of the piston 78 is exposed to a chamber 83 which is connected by way of a passage 84 to the passage 82. Between the pistons 78 and 79 there is a chamber 85 which is in open communication with the atmosphere through a passage 86. The valve 81 is biased in a direction away from its seat by a light spring 87.

As will hereinafter more fully appear the inshot valve device functions to isolate the reserve reservoir 4 from the auxiliary reservoir 3 when an application of the brakes is being effected.

Initial charging of the equipment shown in Fig. 2

With the several parts of the equipment in release position as shown, fluid under pressure supplied to the brake pipe and triple valve piston chamber 10 flows through feed passage 46 to the triple valve slide valve chamber 16 and from thence flows through passage 17 directly to the chamber 27 of the application control valve device and to passage and pipe 18 and from thence to the auxiliary reservoir 3. From the chamber 27 fluid under pressure flows through the port 47 in the control slide valve 26 and the registering passage 33 to the control reservoir 7 in the pipe bracket. Fluid under pressure flows from passage 33 through passage 34 to the control diaphragm chamber 32.

From the feed passage 46 fluid under pressure flows through passage 76, passage 50 and passage and pipe 51 to the reserve reservoir 4, there being a check valve 88 interposed in passage 76 adapted to prevent back flow of fluid under pressure from the reserve reservoir to the feed passage.

The brake cylinder is connected to the atmosphere by way of pipe and passage 38, passage 39, cavity 52 in the control slide valve 26, passage 53, cavity 54 in the triple valve main slide valve and passage 55. The chamber 37 of the application control valve device, since it is connected through passage 40 to the passage 39, is at atmospheric pressure as are the chambers 80 and 83 of the inshot valve device 75 which are in open communication with the passage 39.

Application of the brakes—Fig. 2

When the brake pipe is reduced to effect an application of the brakes the several parts of the triple valve device are shifted in the same manner as hereinbefore described in connection with the equipment shown in Fig. 1 to first close the feed passage 46, cut off the exhaust communication from the brake cylinder to the atmosphere by way of passage 55 and establish communication from the valve chamber 16 to the service port 20 in the main slide valve. When the triple valve ports reach application position, that is to say, when the triple valve piston 12 engages the gasket 56, the service port 20, which has been previously opened by movement of the graduating valve 15 relative to the main valve, registers with passage 82 so that fluid under pressure now flows from the auxiliary reservoir to the brake cylinder by way of pipe and passage 18, passage 17, triple valve slide valve chamber 16, service port 20, passage 82, chamber 80, passage 39 and passage and pipe 38.

Further with the triple valve parts in application position a cavity 89 in the triple valve main slide valve connects the passage 50 to the passage 74 and since the reserve reservoir 4 is connected through pipe and passage 51 to passage 50, fluid under pressure flows from the reserve reservoir to the brake cylinder by way of passage 74, past the unseated inshot control valve 81, inshot valve chamber 80 and passage 39.

It will be seen that when the triple valve main slide valve is in application position an inshot of fluid under pressure is admitted to the brake cylinder from both the auxiliary reservoir and reserve reservoir which inshot acts to cause the brake cylinder to operate quickly to move the brake shoes of the usual brake rigging (not shown), into contact with the vehicle wheels. Fluid under pressure flows from the passage 82 through passage 84 to the piston chamber 83 of the inshot valve device and causes the inshot piston assembly to move inwardly, thereby actuating the inshot valve 81 to cut off the flow of reserve reservoir fluid to the valve chamber 80, the inshot valve having no control whatever over the flow of fluid from the auxiliary reservoir.

When, due to the flow of fluid from the auxiliary reservoir, to the brake cylinder, the pressure of fluid in chamber 27 of the application control valve device reduces, the pressure of fluid in the control chamber 32 causes the several parts of the device to move to application position. In application position a cavity 90 in the control slide valve connects the passage 77 to the brake cylinder branch passage 41. The passage 77 is connected to the passage 74 at a point located intermediate the triple valve main slide valve and the inshot valve 81, so that fluid under pressure now flows from the reserve reservoir 4 to the brake cylinder by way of pipe and passage 51, passages 50, cavity 89 in the triple valve main slide valve passage 74, passage 77, cavity 90 in the control slide valve, passages 41, 40, 39 and passage and pipe 38.

When the brake application as called for by the amount of reduction in brake pipe pressure has been effected the triple valve device and application control valve device will both assume application lap position in the same manner as has been previously described in connection with the operation of the equipment shown in Fig. 1, the triple valve device in this position maintaining the service port 20 so that there can be no flow of fluid from the auxiliary reservoir to the brake cylinder and the application control valve device maintaining the passage 77 closed and disconnected from the brake cylinder branch passage 41 so that there can be no flow of fluid from the reserve reservoir to the brake cylinder.

If there should be leakage from the brake cylinder this leakage will effect a reduction in the pressure of fluid in chamber 37 of the application control valve device. When this occurs the higher pressure in diaphragm chamber 32 causes the several parts of the device to again assume application position in which the cavity 90 in the control slide valve 26 connects the passages 77 and 41 thus admitting fluid under pressure from the reserve reservoir 4 to the brake cylinder to compensate for such leakage. It will thus be seen that since the triple valve device is in application lap position there can be no flow from the auxiliary reservoir to the brake cylinder to compensate for brake cylinder leakage. In this connection it will be understood that the check valve 88 will not be unseated to permit flow of fluid from the auxiliary reservoir so long as the reserve reservoir pressure does not fall below auxiliary reservoir pressure.

If brake cylinder leakage should be such that the reserve reservoir pressure falls below auxiliary reservoir pressure fluid under pressure will flow from the auxiliary reservoir by way of the feed passage 46, check valve 88, passage 76, passage 50, cavity 89 in the triple valve main slide valve, passage 74, passage 77, cavity 90 in the control slide valve 26, passages 41, 40, 39 and passage and pipe 38. When the auxiliary reservoir pressure is thus reduced, fluid at brake pipe pressure in triple valve piston chamber will cause the triple valve piston 12 and thereby the associated valves 14 and 15 to move to release position. The triple valve main slide valve in this position laps the passage 74 thereby cutting off all flow of fluid to the brake cylinder, thus preventing a further reduction in auxiliary reservoir pressure and further preventing the loss of brake pipe fluid which would otherwise occur by way of the feed passage 46 which has been uncovered to the chamber 10 by the piston 12.

Release of the brakes—Fig. 2

The full or graduated release of the brakes is accomplished in substantially the same manner as before described in connection with the equipment shown in Fig. 1. The inshot valve device which may if desired be applied to the equipment shown in Fig. 1 is the only part which has not been previously described in connection with the release of the brakes and in view of this the release operation of this device will now be described. When in effecting either a full or graduated release of the brakes the brake cylinder pressure has been reduced to a very low value, say

Description of equipment shown in Fig. 3

The equipment shown in Fig. 3 with but several exceptions may be identical with the equipment shown in Fig. 2. The equipment illustrated in Fig. 3 differs from that shown in Fig. 2 in the omission of the reserve reservoir charging passage 75 and check valve 88 interposed therein and also in the omission of the control passage 77, and in continuing the passage 50 to the seat for the control slide valve 76. Another difference resides in the provision of quick service means which is associated with the triple valve device and which is adapted to effect a limited local reduction in brake pipe pressure when an application of the brakes is being effected. A further difference resides in the provision of a valve device 100 which is adapted to be controlled by brake cylinder pressure for isolating the reserve reservoir 4 from the auxiliary reservoir 3 when an application of the brakes is being effected and for establishing a charging communication from the auxiliary reservoir to the reserve reservoir when the brakes are being released.

Since the valve device 100 is the only new part included in the equipment and the other parts of the equipment have heretofore been described in detail in connection with Figs. 1 and 2, the following detailed description will be limited to the device and its association with the other parts of the equipment.

The valve device 100 may comprise a casing having operatively mounted therein a piston 101 which is provided with a stem 102 adapted to actuate a slide valve 103 contained in a chamber 104 which is in communication with the atmosphere by way of a passage 105. At the face side of the piston 101 there is a chamber 106 which is connected through a branch passage and pipe 107 to the brake cylinder pipe 38. Contained in chamber 104 is a spring 108 which is interposed between and operatively engages the inner end of the piston stem 102 and the casing. This spring acts to normally maintain the piston in its brake releasing position as shown in Fig 3 and thereby maintains the valve 103 in its charging position.

Initial charging of the equipment in Fig. 3

In initially charging the equipment fluid under pressure supplied to the brake pipe 1 flows through passage 11 to the triple valve piston chamber 10 and from thence flows through feed passage 46 to the valve chamber 16. From this chamber fluid under pressure flows through passage 17 and passage and pipe 18 to the auxiliary reservoir 3.

The pipe 18 is provided with a branch pipe and passage 109 which leads to the seat for the slide valve 103 of the valve device 100 where, with the slide valve in its normal position as shown, a cavity 110 in the slide valve connects the passage 109 to a passage and pipe 111 connected to the reserve reservoir pipe 51. From this it is apparent that fluid under pressure flows from the pipe 18 to the reserve reservoir. To prevent the flow of fluid from the pipe 18 to the reserve reservoir from unduly slowing up the rate of charge of the auxiliary reservoir the rate of charge of the reserve reservoir is retarded by means of a choke 112 which is interposed in the passage 109 as shown or if desired this choke may be interposed in the passage 111.

Aside from the charging of the auxiliary reservoir 3 and reserve reservoir 4 in the manner just described the equipment will be charged with fluid under pressure in the same manner as has heretofore been described in connection with Fig. 2.

Application of the brakes—Fig. 3

When the brake pipe pressure has been reduced to effect an application of the brakes the triple valve device moves to application position in which fluid under pressure is supplied from both the auxiliary reservoir and the reserve reservoir to the brake cylinder, the flow of fluid from the reserve reservoir being by way of the inshot valve 81 as described. When the brake cylinder pressure has been increased to a predetermined degree the inshot valve device operates to cut off the flow of fluid from the reserve reservoir to the brake cylinder by way of the inshot valve chamber 80 in the same manner as has been fully set forth in connection with the equipment illustrated in Fig. 2.

Fluid under pressure being supplied to the brake cylinder flows by way of branch passage 107 to the piston chamber 106 of the valve device 100, causing the piston to move and shift the slide valve 103 to lap passage 111. With the slide valve in this position the auxiliary reservoir and reserve reservoir are isolated from each other.

In response to the reduction in auxiliary reservoir pressure effected by the flow of fluid to the brake cylinder the several parts of the application control valve device move inwardly to application position as described in connection with the equipment shown in Fig. 2.

In application position the cavity 90 in the slide valve 26 connects the passage 50 to the brake cylinder branch passage 41, so that even though the inshot valve 81 is closed fluid under pressure will flow at a slower rate from the reserve reservoir to the brake cylinder by way of pipe and passage 51, passage 50, cavity 90 in the control slide valve 26, passages 41, 40 and 39 and passage and pipe 38.

Now when the triple valve device and application control valve device assume application lap position in the manner described in connection with the equipment illustrated in either Fig. 1 or Fig. 2, the graduating valve 15 cuts off the flow of fluid from the auxiliary reservoir to the brake cylinder and the control slide valve 26 cuts off the flow of fluid from the reserve reservoir 4 to the brake cylinder.

When the triple valve main slide valve 14 moves to application position a cavity 113 therein connects a passage 114 leading from the triple valve piston chamber 10 and thereby from the brake pipe to a passage 115 leading to a quick service chamber 116, so that fluid under pressure is locally vented from the brake pipe.

If leakage occurs from the brake cylinder the brake cylinder pressure and consequently the pressure of chamber 37 of the application control valve device which is in open communication with the brake cylinder will be correspondingly reduced. Upon such reduction the pressure of fluid in control chamber 32 causes the several parts of the application control valve device to again assume application position in which fluid under pressure flows from the reserve reservoir to the brake cylinder until such time as the supply of fluid from the reserve reservoir to the brake cylinder compensates for such leakage. When this is accomplished the several parts of the device are caused to again assume application lap position. These maintaining operations may continue until the pressures of the reserve reservoir are equalized. The reserve reservoir is made of sufficiently large volume to maintain brake cylinder pressure against leakage under ordinary conditions of service. This is also true as to all of the other forms of the invention shown in the drawings. It will here be understood that since brake cylinder leakage cannot reduce auxiliary reservoir pressure the triple valve device will remain in application lap position during the maintaining operations of the application control valve device.

Since as just described the maintenance of brake cylinder pressure against leakage cannot rob the auxiliary reservoir and therefore the brake pipe of fluid under pressure it follows that this feature can in no way adversely affect the prompt release of the brakes.

*Release of the brakes—Fig. 3*

In releasing the brakes the triple valve device and application control valve device are caused to move to release position in substantially the same manner as previously described in connection with the equipment shown in either Fig. 1 or Fig. 2. In the present equipment however the recharge of the reserve reservoir is accomplished in a different manner than in the equipments of Figs. 1 and 2. In the present equipment when, in releasing the brakes, the brake cylinder pressure has been reduced to some very low degree the spring 108, of the valve device 100 acts to return the piston 101 and thereby the slide valve 103 to normal release position in which the cavity 110 in the valve again connects the passages 109 and 111 and permits fluid under pressure to flow from the auxiliary reservoir pipe 18 to the reserve reservoir 4.

With the main slide valve of the triple valve device in release position the cavity 113 connects the passage 115 to the passage 74 so that when the inshot valve 81 is caused to move from its seat, fluid under pressure is vented from the quick service chamber with fluid being vented from the brake cylinder by way of passage 39.

In graduating the release of the brakes the valve device 100 in no way alters the graduating operations of the application control valve device.

*Description of the equipment shown in Fig. 4*

In Fig. 4 another form of the invention is illustrated in which the valve device for isolating the auxiliary reservoir 3 and reserve reservoir from each other in effecting an application of the brakes and for establishing the charging communication from the auxiliary reservoir to the reserve reservoir in effecting the release of the brakes, may be identical in construction with that of the corresponding valve device 100 of the equipment shown in Fig. 3 or may be constructed according to the showing in Fig. 4.

If the valve device 100 as shown in Fig. 3 is employed the piston chamber 106 is connected to the quick service chamber 116 so that when in effecting an application of the brakes fluid under pressure is vented from the brake pipe to the quick service chamber the piston 101 of the valve device will be caused to move and shift the slide valve 103 to close the communication between the auxiliary reservoir and reserve reservoir. When in releasing the brakes the quick service chamber and thereby the piston chamber 106 of the valve device is vented to the atmosphere, the spring 108 of the device acts to shift the piston 101 and thereby the slide valve 103 to their normal position as shown in Fig. 3 in which position the cavity 110 in the slide valve again establishes the charging communication between the auxiliary reservoir 3 and reserve reservoir 4.

The construction of the valve device shown in Fig. 4 differs somewhat from that of the corresponding device shown in Fig. 3 and will therefore be referred to as the valve device 150.

This valve device 150 may comprise a casing in which there is operatively mounted a piston 151 having a stem 152 adapted to actuate a slide valve 153 contained in a chamber 154 which is constantly connected to the auxiliary reservoir passage 109 by way of a passage 155. At the face side of the piston 151 there is a chamber 156 which is connected through a pipe and passage 157 to the quick service chamber 116. Interposed between and operatively engaging the casing and the face of the piston is a spring 158 which at all times tends to move the piston inwardly from the position in which it is shown.

Since as previously described the quick service chamber is normally at atmospheric pressure, the piston chamber 156 of the valve device 150 will also be at atmospheric pressure, so that when the equipment is charged with fluid under pressure the piston 151 and thereby the slide valve 153 will be maintained in their normal position against the opposing pressure of the spring 158 by the pressure of fluid in valve chamber 154 as supplied from the auxiliary reservoir through the passages 109 and 155. In this position a cavity 159 connects the passages 109 and 111 together so that the reserve reservoir is charged with fluid under pressure by way of the auxiliary reservoir 3 in the same manner as described in connection with the equipment shown in Fig. 3.

When an application of the brakes is being effected the falling auxiliary reservoir pressure in valve chamber 154 and the rising quick service chamber pressure in piston chamber 156 become substantially equal, the spring 158 acts to shift the piston 151 and thereby the slide valve 153 inwardly a sufficient distance to lap the passage 111, thus closing the communication between the auxiliary reservoir and the reserve reservoir.

When, in releasing the brakes, the rising auxiliary reservoir pressure in valve chamber 154 acting on the valve side of the piston 151 is sufficient to overcome the opposing pressures of the spring 158 and the falling quick service chamber pressure acting on the face of the piston, the piston and thereby the slide valve 154 are again shifted to their normal positions as shown in Fig. 4. With the slide valve in this position the cavity 159 again establishes communication between the auxiliary reservoir 3 and the reserve reservoir 4.

*Description of the equipment shown in Fig. 5*

In Fig. 5 another form of the invention is illustrated which differs slightly from the equipments shown in Figs. 3 and 4. Instead of controlling the valve device which isolates the auxiliary reservoir and reserve reservoir when an application of the brakes is being effected by brake cylinder fluid as shown in Fig. 3 or by quick service reservoir fluid as shown in Fig. 4 the corresponding valve device 170 in Fig. 5 is controlled by auxiliary reservoir pressure through the operation of the triple valve device.

As shown the valve device 170 may comprise a casing having operatively mounted therein a piston 171 which is provided with a stem 172 adapted to actuate a slide valve 173 contained in a chamber 174 which is in constant open communication with the auxiliary reservoir 3 by way of auxiliary reservoir passage 109 and a branch auxiliary reservoir passage 175. At the face side of the piston 171 there is a piston chamber 176 which as shown is normally connected through a pipe and passage 177 and a port 178 in the triple valve main slide valve to the triple valve slide valve chamber 16. Contained in the piston chamber 176 is a spring 179 which at all times tends to move the piston 171 inwardly.

With the equipment fully charged both sides of the piston 176 are subjected to auxiliary reservoir pressure, so that the spring 179 maintains the piston and thereby the slide valve 173 in their normal position as shown. With the slide valve 14 in this position a cavity 180 in the valve connects the passages 111 and 109 together, thus establishing communication between the auxiliary reservoir 3 and the reserve reservoir 4.

When an application of the brakes is initiated by a reduction in brake pipe pressure and the triple valve parts move toward application position in response to the brake pipe reduction, the slide valve 14 in its movement shifts the port 178 out of registration with the passage 177 thus closing communication between the valve chamber 16 and the piston chamber 176. Immediately following the closing of this communication a cavity 181 in the main slide valve 14 connects the passage 177 to a passage 182 which leads to the atmosphere. With this latter communication established fluid under pressure is vented from the piston chamber 176 to the atmosphere, and as a result the pressure of fluid in valve chamber 174 causes the piston and thereby the slide valve to move outwardly against the opposing pressure of the spring 179. The slide valve in its outer position laps the auxiliary reservoir passage 109 thus closing communication between the auxiliary reservoir and the reserve reservoir and thereby isolating the reserve reservoir from the auxiliary reservoir and brake pipe.

When in releasing the brakes the triple valve main slide valve 14 is returned to release position the atmospheric communication from the piston chamber 176 is closed and the port 178 is in registration with the passage 177 so that fluid under pressure is again supplied from the slide valve 16 of the triple valve device to the piston chamber 176. Now when the pressure of fluid in chamber 176 becomes substantially equal to the pressure of fluid in valve chamber 174 the spring 179 acts to move the piston 171 and thereby the slide valve 173 to their normal position as shown in Fig. 5, in which position the cavity 180 in the valve again connects the passages 109 and 111, so that fluid under pressure is now free to flow from the auxiliary reservoir pipe 18 to the reserve reservoir.

General considerations

It will be apparent from the drawings and the foregoing description that since, in effecting an application of the brakes, each of the forms of the invention disclosed functions to separate the reserve reservoir from the auxiliary reservoir so that in maintaining brake cylinder pressure against leakage the auxiliary reservoir, under service conditions to be expected, will not be called upon to compensate for such leakage. By reason of this the auxiliary reservoir and brake pipe, in releasing the brakes, will be recharged in a much shorter time than if the auxiliary reservoir pressure had been reduced more than called for by the degree of reduction in brake pipe pressure required to effect a chosen application of the brakes. This insures the prompt and positive release of the brakes regardless of the length of the train.

While several illustrative embodiments of our invention have been described in detail, it is not our intention to limit its scope to these embodiments or otherwise than by the terms of the appended claims.

Having now described our invention, what we claim as new and desire to secure by Letters Patent, is:

1. In a fluid pressure brake equipment, in combination, a brake pipe, a brake cylinder, an auxiliary reservoir and another reservoir normally in communication with each other and charged with fluid under pressure, and brake controlling mechanism comprising valve means operative upon a reduction in brake pipe pressure to isolate the reservoirs from each other and to supply fluid under pressure from said auxiliary reservoir to the brake cylinder to effect an application of the brakes and further comprising a valve device responsive to a reduction in auxiliary reservoir pressure occasioned by the flow of fluid to the brake cylinder for supplying fluid under pressure from said other reservoir to the brake cylinder to assist in effecting the application of the brakes, said valve means and valve device being operative upon the attainment of brake cylinder pressure called for by the reduction in brake pipe pressure for isolating said reservoirs from each other and from the brake cylinder and said valve device being operative upon a subsequent reduction in brake cylinder pressure due to leakage for again supplying fluid from said other reservoir to the brake cylinder to compensate for the leakage.

2. In a fluid pressure brake equipment, in combination, a brake pipe, a brake cylinder, an auxiliary reservoir and another reservoir normally in communication with each other and charged with fluid under pressure, and brake controlling mechanism operative upon a reduction in brake pipe pressure to first supply fluid under pressure from said auxiliary reservoir to the brake cylinder to effect an application of the brakes and being then operative upon a reduction in auxiliary reservoir pressure resulting from the flow of fluid from the auxiliary reservoir to the brake cylinder to supply fluid under pressure from said other reservoir to the brake cylinder to assist in effecting an application of the brakes, said mechanism being operative upon the attainment of the brake cylinder pressure called for by the reduction in brake pipe pressure to isolate said reservoirs from each other and the brake cylinder and being operative upon a subsequent reduction in brake cylinder pressure for again supplying fluid from said other reservoir to the brake cylinder while maintaining the auxiliary reservoir isolated from said other reservoir and brake cylinder.

3. In a fluid pressure brake equipment, in combination, a brake pipe, a brake cylinder, an auxiliary reservoir and another reservoir normally in communication with each other and charged with fluid under pressure from the brake pipe, and brake controlling mechanism operative upon a reduction in brake pipe pressure to first close the charging communication from the brake pipe to said reservoirs and to then supply fluid under pressure from both reservoirs to the brake cylinder to effect an application of the brakes and being then operative to isolate said reservoirs from each other and from the brake cylinder, said mechanism being operative upon leakage of fluid pressure from the brake cylinder for again supplying fluid under pressure from said other reservoir to the brake cylinder while maintaining the auxiliary reservoir isolated from said other reservoir and brake cylinder.

4. In a fluid pressure brake equipment, in combination, a brake pipe, a brake cylinder, an auxiliary reservoir and another reservoir normally in communication with each other and with the brake pipe and charged with fluid under pressure from the brake pipe, and brake controlling mechanism operative upon a reduction in brake pipe pressure to first close communication from the brake pipe to the reservoirs, to then supply fluid under pressure from both reservoirs to the brake cylinder to effect an application of the brakes and being then operative to isolate said reservoirs from each other and from the brake cylinder, said mechanism being operative upon a subsequent reduction in brake cylinder pressure for again supplying fluid from said other reservoir to the brake cylinder.

5. In a fluid pressure brake equipment, in combination, a brake pipe, a brake cylinder, an auxiliary reservoir and another reservoir normally in communication with each other and with the brake pipe and charged with fluid under pressure from the brake pipe, and brake controlling mechanism operative upon a reduction in brake pipe pressure to first close communication from the brake pipe to the reservoirs, to then supply fluid under pressure from both reservoirs to the brake cylinder to effect an application of the brakes and being then operative to isolate said reservoirs from each other and from the brake cylinder, said mechanism being operative upon a subsequent reduction in brake cylinder pressure for again supplying fluid from said other reservoir to the brake cylinder and while maintaining the brake pipe isolated from both reservoirs.

6. In a fluid pressure brake equipment, in combination, a brake pipe, a brake cylinder, an auxiliary reservoir and another reservoir normally in communication with each other and charged with fluid under pressure, and brake controlling mechanism comprising valve means operative upon a reduction in brake pipe pressure to isolate the reservoirs from each other and to supply fluid under pressure from said auxiliary reservoir to the brake cylinder to effect an application of the brakes, further comprising a valve device responsive to a reduction in auxiliary reservoir pressure occasioned by the flow of fluid to the brake cylinder for supplying fluid under pressure from said other reservoir to the brake cylinder to assist in effecting the application of the brakes, said valve means and valve device being operative upon the attainment of the brake cylinder pressure called for by the reduction in brake pipe pressure for isolating said reservoirs from each other and from the brake cylinder, said valve device being operative upon a subsequent reduction in brake cylinder pressure due to leakage for again supplying fluid from said other reservoir to the brake cylinder to compensate for the leakage, said valve means being operative upon an increase in brake pipe pressure following an application of the brakes to vent fluid under pressure from the brake cylinder to effect a release of the brakes and to again establish communication between the reservoirs.

7. In a fluid pressure brake equipment, in combination, a brake pipe, a brake cylinder, an auxiliary reservoir and another reservoir normally in communication with each other and with the brake pipe and charged with fluid under pressure from the brake pipe, and brake controlling mechanism operative upon a reduction in brake pipe pressure to first close communication from the brake pipe to the reservoirs, to then supply fluid under pressure from both reservoirs to the brake cylinder to effect an application of the brakes and being then operative to isolate said reservoirs from each other and from the brake cylinder, said mechanism being operative upon a subsequent reduction in brake cylinder pressure for again supplying fluid from said other reservoir to the brake cylinder and while maintaining the brake pipe isolated from both reservoirs said mechanism being operative upon an increase in brake pipe pressure following an application of the brakes to vent fluid under pressure from the brake cylinder to effect a release of the brakes and to again establish communication between both reservoirs and between the brake pipe and both reservoirs.

8. In a fluid pressure brake equipment, in combination, a brake pipe, an auxiliary reservoir and a reserve reservoir normally in communication with each other and charged with fluid under pressure from the brake pipe, and brake controlling mechanism operative upon a reduction in brake pipe pressure to first close the charging communication from the brake pipe to said reservoirs and to then supply fluid under pressure from both of the reservoirs for effecting an application of the brakes, and operative upon an increase in the pressure of the brake applying fluid to the degree called for by the reduction in brake pipe pressure for isolating the reservoirs from each other and for cutting off the flow of brake applying fluid from both of the reservoirs, said brake controlling mechanism being operative upon a reduction in the pressure of the brake applying fluid for again supplying brake applying fluid from the reserve reservoir while maintaining the auxiliary reservoir isolated from the reserve reservoir.

9. In a fluid pressure brake equipment, in combination, a brake pipe, an auxiliary reservoir and a reserve reservoir normally in communication with each other and charged with fluid under pressure, and brake controlling mechanism operative upon a reduction in brake pipe pressure to first close the communication from the brake pipe to said reservoirs and to then supply fluid under pressure from both of the reservoirs for effecting an application of the brakes, and operative upon an increase in the pressure of the brake applying fluid to the degree called for by the reduction in brake pipe pressure for isolating the reservoirs from each other and for cutting off the flow of brake applying fluid from both of the reservoirs, said brake controlling mechanism being operative upon a reduction in the pressure of the brake applying fluid for again supplying brake applying fluid from the reserve reservoir while preventing the flow of brake applying fluid from the auxiliary reservoir.

10. In a fluid pressure brake equipment, in combination, a brake pipe, an auxiliary reservoir and a reserve reservoir normally in communication with each other and charged with fluid under pressure from the brake pipe, and brake controlling mechanism operative upon a reduction in brake pipe pressure to first close the charging communication from the brake pipe to said reservoirs and to then supply fluid under pressure from both of the reservoirs for effecting an application of the brakes, and operative upon an increase in the pressure of the brake applying fluid to the degree called for by the reduction in brake pipe pressure for isolating the reservoirs from each other and for cutting off the flow of brake applying fluid from both of the reservoirs, said brake controlling mechanism being operative upon a reduction in the pressure of the brake applying fluid for again supplying brake applying fluid from the reserve reservoir while preventing a further reduction in auxiliary reservoir.

11. In a fluid pressure brake equipment, in combination, a brake pipe, an auxiliary reservoir and a reserve reservoir normally in communication with each other and charged with fluid under pressure from the brake pipe, and brake controlling mechanism operative upon a reduction in brake pipe pressure to first close the charging communication from the brake pipe to said reservoirs and to then supply fluid under pressure from both of the reservoirs for effecting an application of the brakes, and operative upon an increase in the pressure of the brake applying fluid to the degree called for by the reduction in brake pipe pressure for isolating the reservoirs from each other and for cutting off the flow of brake applying fluid from both of the reservoirs, said brake controlling mechanism being operative upon a reduction in the pressure of the brake applying fluid for again supplying brake applying fluid from the reserve reservoir while maintaining closed the communication through which brake applying fluid was previously supplied from the auxiliary reservoir.

12. In a fluid pressure brake equipment, in combination, a brake pipe, an auxiliary reservoir and a reserve reservoir normally charged with fluid under pressure from the brake pipe, a brake controlling mechanism operative upon a reduction in brake pipe pressure for first closing the charging communication from the brake pipe to said reservoirs and for then supplying fluid under pressure from both of said reservoirs to effect an application of the brakes, operative upon an increase in the pressure of the brake applying fluid to the degree called for by the reduction in brake pipe pressure for cutting off the supply of brake applying fluid from both of the reservoirs, and operative automatically upon a reduction in the brake applying fluid due to leakage for supplying fluid under pressure from the reserve reservoir to compensate for said leakage, and means maintaining said auxiliary reservoir isolated from the reserve reservoir while fluid under pressure is being supplied to compensate for leakage.

13. In a fluid pressure brake equipment, in combination, a brake pipe, a brake cylinder, an auxiliary reservoir and a reserve reservoir normally charged with fluid under pressure, a triple valve device normally establishing communications through which both reservoirs are charged with fluid under pressure from the brake pipe, said triple valve device being operative upon a reduction in brake pipe pressure to close said communications and to establish a communication through which fluid under pressure flows from the auxiliary reservoir to the brake cylinder, an application control valve device operated upon a reduction in auxiliary reservoir pressure to establish a communication through which fluid under pressure flows from the reserve reservoir to assist in effecting the application of the brakes, said triple valve device and said application control valve device being operative upon the attainment of the brake cylinder pressure called for by the amount of reduction in brake pipe pressure to cut off the flow of fluid to the brake cylinder, said application control valve device being automatically operative when leakage of fluid from the brake cylinder occurs for supplying fluid under pressure from the reserve reservoir to the brake cylinder.

14. In a fluid pressure brake equipment, in combination, a brake pipe, a brake cylinder, an auxiliary reservoir and a reserve reservoir normally charged with fluid under pressure, a triple valve device normally establishing communications through which both reservoirs are charged with fluid under pressure from the brake pipe, said triple valve device being operative upon a reduction in brake pipe pressure to close said communications and to establish a communication through which fluid under pressure flows from the auxiliary reservoir to the brake cylinder, an application control valve device operated upon a reduction in auxiliary reservoir pressure to establish a communication through which fluid under pressure flows from the reserve reservoir to assist in effecting the application of the brakes, said triple valve device and said application control valve device being operative upon the attainment of the brake cylinder pressure called for by the amount of reduction in brake pipe pressure to cut off the flow of fluid to the brake cylinder, said triple valve device in operating to cut off the flow of fluid to the brake cylinder isolating the auxiliary reservoir from the reserve reservoir, and said application control valve device being automatically operative when brake cylinder pressure is reduced by leakage to admit fluid under pressure from the reserve reservoir to the brake cylinder.

EARLE S. COOK.
JOHN CANETTA.